(12) United States Patent
Lee

(10) Patent No.: US 11,440,351 B2
(45) Date of Patent: Sep. 13, 2022

(54) WHEEL AND AIRLESS TIRE ASSEMBLY

(71) Applicant: Sung Kee Lee, Gwangju (KR)

(72) Inventor: Sung Kee Lee, Gwangju (KR)

( * ) Notice: Subject to any disclaimer, the term of this patent is extended or adjusted under 35 U.S.C. 154(b) by 277 days.

(21) Appl. No.: 16/638,268

(22) PCT Filed: Sep. 12, 2017

(86) PCT No.: PCT/KR2017/009973
§ 371 (c)(1),
(2) Date: Feb. 11, 2020

(87) PCT Pub. No.: WO2019/054523
PCT Pub. Date: Mar. 21, 2019

(65) Prior Publication Data
US 2020/0171884 A1 Jun. 4, 2020

(51) Int. Cl.
*B60C 7/18* (2006.01)
*B60B 9/02* (2006.01)
*B60C 7/26* (2006.01)

(52) U.S. Cl.
CPC ............... *B60C 7/18* (2013.01); *B60B 9/02* (2013.01); *B60C 7/26* (2013.01)

(58) Field of Classification Search
CPC ............... B60C 7/18; B60C 7/26; B60B 9/02
See application file for complete search history.

(56) References Cited

U.S. PATENT DOCUMENTS 6,286,572 B1 * 9/2001 Chen ................. B60D 1/52
152/84
7,743,806 B2 * 6/2010 Abe .................. B60C 7/14
152/21
8,127,809 B2 * 3/2012 Russell ............. B60B 19/00
152/40
9,713,940 B2 * 7/2017 Nishida ............. B60B 9/02
2011/0248554 A1 10/2011 Chon et al.
(Continued)

FOREIGN PATENT DOCUMENTS

JP 2010-137648 A 6/2010
KR 10-1293843 B1 8/2013
(Continued)

OTHER PUBLICATIONS

International Search Report for PCT/KR2017/009973 dated Jun. 11, 2018.

*Primary Examiner* — Kip T Kotter
(74) *Attorney, Agent, or Firm* — The PL Law Group, PLLC

(57) ABSTRACT

An airless tire includes an inner wheel including flanges having fin fastening holes, an outer wheel receiving the inner wheel and including a tread part molded into the outer surface of a drum with at least one of through holes and irregularities to be united with the drum, with the inner periphery of the tread part embedded in the through holes or irregularities, a middle wheel including elastomers, a peripheral part having fin fastening holes and formed on the inner periphery of the elastomers, and ribs in the middle of the elastomers, a fixing device attaching the inside of the outer wheel to the outside of the middle wheel and then detachably uniting the middle wheel and the outer wheel, and coupling fins that allow the inner wheel and the middle wheel to be detachably held together by being inserted through the fin fastening holes and the fin fastening holes.

7 Claims, 9 Drawing Sheets

(56) References Cited

U.S. PATENT DOCUMENTS

2014/0083581 A1\* 3/2014 Schaedler ................. B60B 9/26
          152/5
2019/0152256 A1\* 5/2019 Hwang ................... B60C 7/143

FOREIGN PATENT DOCUMENTS

KR  10-2014-0028473 A    3/2014
WO  WO 2016/099480 A1    6/2016

\* cited by examiner

Prior Art

Prior Art

WHEEL AND AIRLESS TIRE ASSEMBLY

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2017/009973 filed on Sep. 12, 2017, the entire contents of which are incorporated herein by reference.

FIELD OF THE INVENTION

The present invention relates to an airless tire mainly used on forklifts and industrial, agricultural, mining, and construction applications, that prevents a tread part from peeling off the outer wheel as it comes into contact with the road surface during rotation or driving, gives a more comfortable ride by minimizing shocks and rattles caused by an irregular road surface, and improves the durability of the outer wheel.

RELATED ART

The tread parts of most tires are inflatable tread parts which are inflated with air pressure as the inside of the tread part or a tube inside the tread part fills with air. A tread part of this type needs to be filled up with air on a regular basis since there may be an air leak in the tread part during travel. Moreover, if a puncture occurs during driving, this could lead to an accident and involve many other problems including the difficulty of repairing the puncture.

To resolve these problems, in recent years, airless tires are increasingly used on forklifts or other special automobiles. However, airless tires are less flexible and have less contact with the ground on rough road surfaces, and this may result in vibration and a less comfortable ride.

To overcome these problems, Korean Laid-Open Patent No. 10-2009-0049982, entitled "Airless tire" as shown in FIGS. 1 and 2 was disclosed, and its components will be described below.

Below are the components of this airless tire.

This airless tire includes a wheel including an inner wheel 10 and an outer wheel 20, a plurality of flexible members 230 that are arranged and attached radially on the outer circumference of the wheel and elastically deform in response to external forces; flexible links 24 that are respectively attached to the flexible members and transmit an external impact force uniformly to the flexible members; rail plates 27 where sliders at either end of the flexible links are slidably attached; and a plurality of fitting grooves formed on the inner circumference where the rail plates are fitted by insertion.

Korean Laid-Open Patent No. 10-2009-0049982 with the above-described construction was problematic in that the flexible members 23 and flexible links 24 lose their flexibility over a long period of use and therefore cannot function properly, thus resulting in a much less comfortable ride due to vibration.

SUMMARY

The present invention provides an airless tire mainly used on forklifts and industrial, agricultural, mining, and construction applications, that prevents a tread part from peeling off the outer wheel as it comes into contact with the road surface during rotation or driving, gives a more comfortable ride by minimizing shocks and rattles caused by an irregular road surface, and improves the durability of the outer wheel.

In an aspect, the present invention provides an airless tire including:

a cylindrical inner wheel 100 including flanges 110 on either edge that face each other, the flanges having fin fastening holes 111 spaced at regular intervals around the circumference;

a cylindrical outer wheel 200 for receiving the inner wheel, that includes a tread part 220 molded into the outer surface of a drum 210 with either a plurality of through holes 211 or irregularities or both in such a way as to be united with the drum, with the inner periphery of the tread part being embedded in the through holes or irregularities;

a cylindrical middle wheel 300 mounted between the inner wheel and the outer wheel, that includes quadrangular elastomers 310 with hollows 311 inside that are arranged at regular intervals, a peripheral part 320 with fin fastening holes 321 that is formed on the inner periphery of the arranged elastomers, and ribs 330 formed in the middle of the elastomers;

a fixing means 400 for firmly attaching the inside of the outer wheel to the outside of the middle wheel and then detachably uniting the middle wheel and the outer wheel; and coupling fins 500 that allow the inner wheel and the middle wheel to be detachably held together by being inserted through the fin fastening holes of the inner wheel and the fin fastening holes of the middle wheel, after the inside of the middle wheel is firmly attached to the outside of the inner wheel.

The flanges of the inner wheel come into close contact with the peripheral part 320 of the middle wheel while holding the same. The elastomers 310 are in either a rectangular or trapezoidal shape. Stepped parts 340, shorter in height than the middle part, are formed around the circumference on either edge of the elastomers 310 arranged at regular intervals.

The fixing means 400 includes: fixing pieces 410 attached to the hollows of the elastomers by being inserted along the width of the elastomers; and bolts 420 for fixing the two ends of the fixing pieces, the elastomers, and the drum together by being inserted therethrough. The fixing means 400 includes: L-shaped reinforced rings 430 attached to either inside edge of the drum; bolts 420 for fixing one side of the reinforced rings and the drum together by being inserted therethrough; and fixing pins 440 that are inserted along the other side of the reinforced rings and the width of the elastomers.

A hub 120 that fits in with each vehicle company's product is mounted inside the inner wheel.

As explained with respect to the above aspect, the airless tire thus constructed according to the present invention has the advantages of preventing a tread part from peeling off the outer wheel as it comes into contact with the road surface during rotation or driving, giving a more comfortable ride by minimizing shocks and rattles caused by an irregular road surface, and improving the durability of the outer wheel to ensure safety.

DESCRIPTION OF EXEMPLARY EMBODIMENTS

Figure 1:
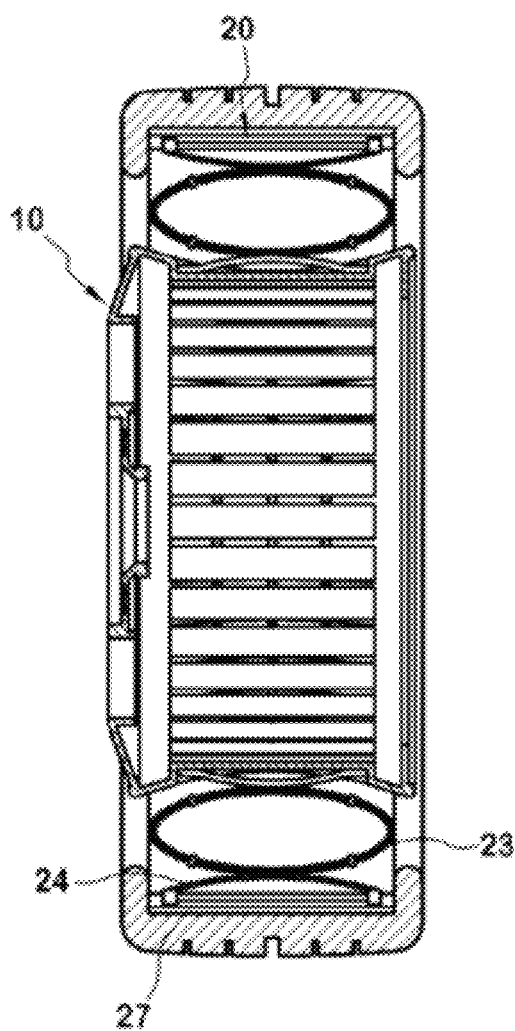
FIG. 1 is a cross-sectional view of a conventional airless tire.
Figure 2:
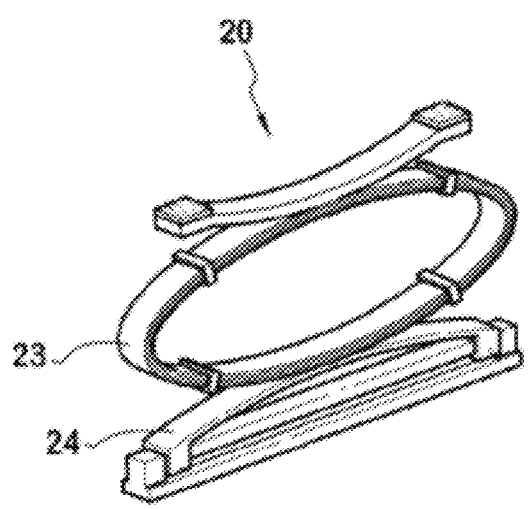
FIG. 2 is a partial perspective view of an elastomer of a conventional airless tire.
Figure 3A:
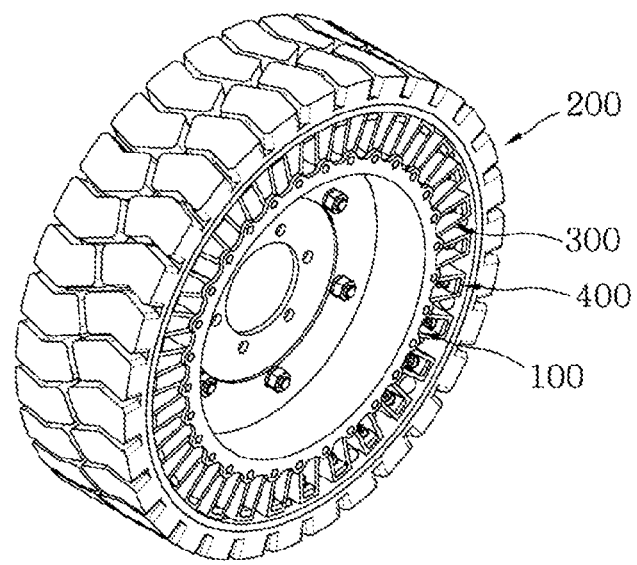
FIGS. 3a and 3b are assembled views of airless tires according to first and second exemplary embodiments of the present invention.
Figure 3B:
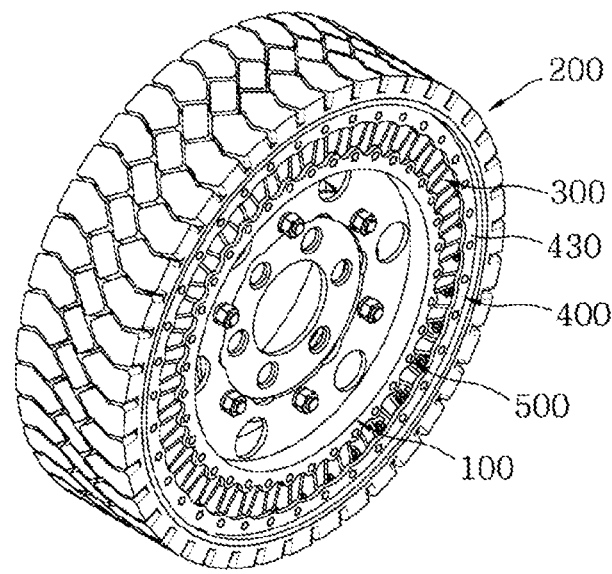

An airless tire according to the present invention prevents a tread part from peeling off the outer wheel as it comes into contact with the road surface during rotation or driving, gives a more comfortable ride by minimizing shocks and rattles caused by an irregular road surface during driving, allows for replacement of broken or damaged components of the tire, and enhances safety and stiffness. An airless tire according to an exemplary embodiment of the present invention will be described below with reference to the accompanying drawings.

Below is an airless tire according to an exemplary embodiment of the present invention.

An airless tire according to the present invention is mainly installed and used on forklifts and industrial, agricultural, mining, and construction applications. The airless tire basically includes a cylindrical inner wheel 100 where the axle of the wheel is mounted through the center, a cylindrical outer wheel 200 mounted to receive the inner wheel 100 and formed with a flexible tread part 230 on the outer surface, and a cylindrical middle wheel 300 that is located between the inner wheel 100 and the outer wheel 200 and cushions shock as it deflates and inflates.

The tire with the above basic components according to the present invention will be described below in more details.

The tire according to the present invention is configured in such a way that flanges 110 are formed on either edge of the inner wheel 100 to face each other, with fin fastening holes 111 spaced at regular intervals around the circumference. Preferably, the fin fastening holes 111 formed at regular intervals on the facing flanges 110 are on the same horizontal line, in order to easily and correctly attach coupling fins 500 and give them high coupling strength.

Moreover, the inner wheel 100 has high durability so its cylindrical shape is not deformed or damaged by any kind of impact, and a hub 120 that fits in with each vehicle company's different wheel axle mounting structure is mounted inside the inner wheel 100.

The middle wheel 300 is mounted on the outer circumferential surface of the inner wheel 100 in such a way as to be detachable from the inner wheel 100 by using the coupling fins 500. The middle wheel 300 includes quadrangular elastomers 310 with hollows 311 inside that are consecutively arranged around the circumference at regular intervals, a peripheral part 320 with fin fastening holes 321 that is formed on the inner periphery of the consecutively arranged elastomers 310, and ribs 330 that are placed in the middle of the elastomers 310 and give stiffness to the middle wheel 300.

The quadrangular elastomers 310 with hollows 311 inside are preferably in either a rectangular or trapezoidal shape, and are made of rubber, silicon, or other flexible materials that elongate or recoil in length, shrink, bend, and are restorable.

The quadrangular elastomers 310 with hollows 311 inside are consecutively arranged at regular intervals around the circumference in order to allow the cylindrical middle wheel 300 to withstand shock or pressure from one side without collapse of the cylindrical shape.

Moreover, the peripheral part 320 with fin fastening holes 321 that fit in with the fin fastening holes 111 is formed on the inner periphery of the elastomers 310 forming the middle wheel 300, thereby uniting the elastomers 310 together.

In addition, the ribs 330 for connecting the elastomers 310 together, preventing displacement, and giving stiffness to the middle wheel 300 are formed in the middle of the elastomers 310. Thus, a stable distance may be kept between the inner wheel 100 and the outer wheel 20, thereby maintaining the shape of the middle wheel 300 and providing stiffness and stability.

Another advantage is that the elastomers 310, because of the hollows 311 inside them, in addition to their quadrangular shape, can recover their shape immediately when deformed under impact or pressure and are not easily deformable. Also, when the elastomers 310 are deformed under impact or pressure, they stretch (elongate) along the length of the elastomers 310—that is, towards the outer wheel 200 and the inner wheel 100, with their hollows 311 being extended in the opposite direction, i.e., in the circumferential direction.

Figure 6A:
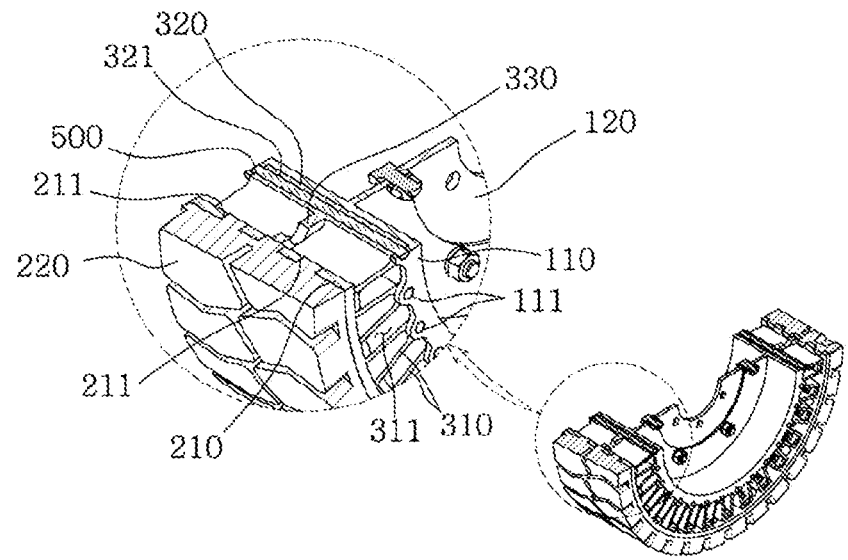
FIGS. 6a and 6b are enlarged sectional views of essential parts which show how an inner wheel and a middle wheel are assembled together, in airless tires according to first and second exemplary embodiments of the present invention.
Figure 6B:
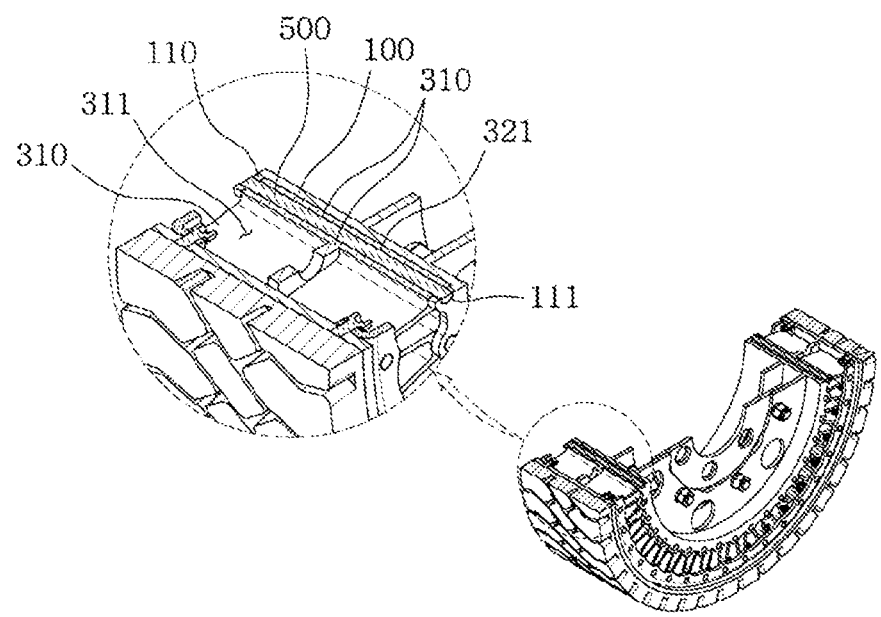

In a method of fastening the middle wheel 300 and inner wheel 100 having the above-described operational effects according to first and second exemplary embodiments, as shown in FIGS. 6a and 6b, the peripheral part 320 of the middle wheel 300 is fitted to the outer surface of the inner wheel 100. That is, the middle wheel 300 and the inner wheel 100 are firmly attached while the flanges 110 hold the peripheral part 320, and then held together by a press-fit by inserting the coupling fins 500 through the fin fastening holes 111 and the fin fastening holes 321.

To separate the middle wheel 300 and inner wheel 100 held together as above, the coupling fins 500, which hold together the middle wheel 300 and the inner wheel 100 by a press-fit by being inserted through the fin fastening holes 111 and the fin fastening holes 321, are removed, and then the peripheral part 320 of the middle wheel 300 is removed from the outer surface of the inner wheel 100.

The inner wheel 100 and the middle wheel 300 are firmly and stably held together since a plurality of fin fastening holes 111 and fin fastening holes 321 are formed at regular intervals around the circumferences of the inner wheel 100 and middle wheel 300.

Figure 4A:
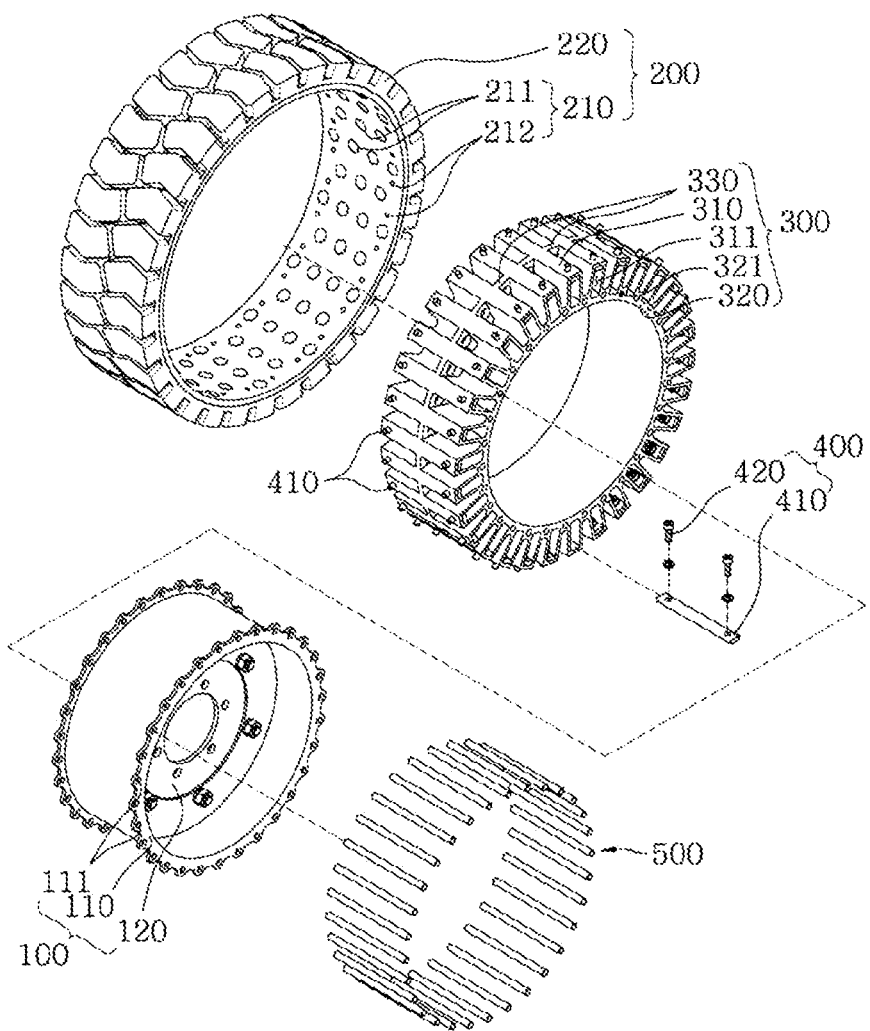
FIGS. 4a and 4b are exploded views of airless tires according to first and second exemplary embodiments of the present invention.
Figure 4B:
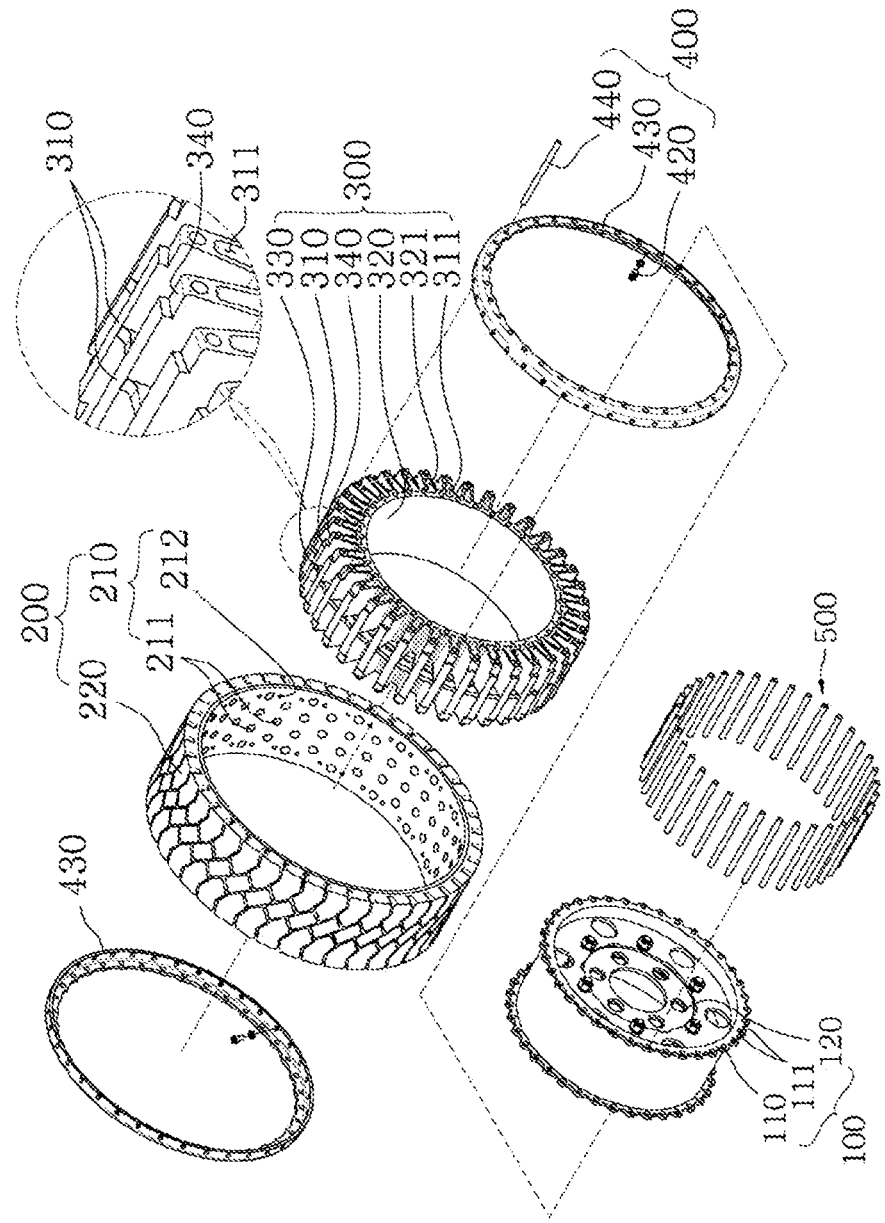
Figure 5A:
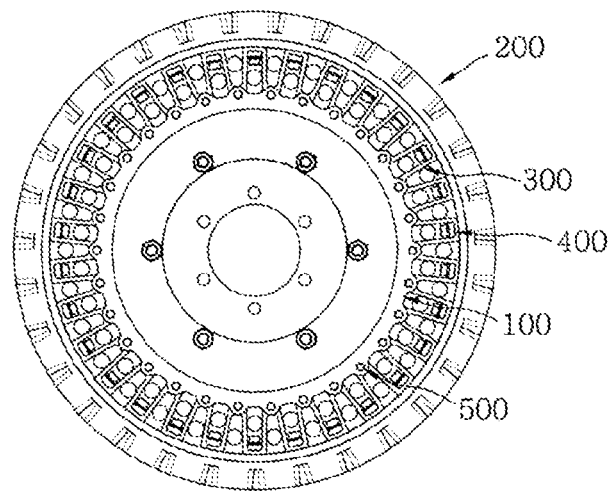
FIGS. 5a and 5b are assembled side views of airless tires according to first and second exemplary embodiments of the present invention.
Figure 5B:
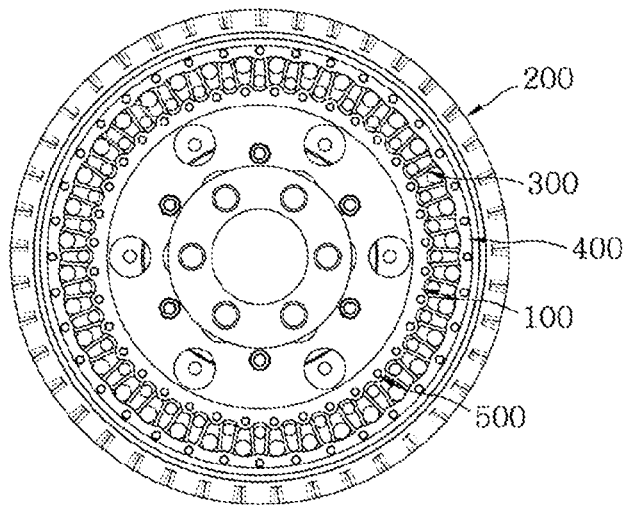

Meanwhile, as shown in FIGS. 4a and 4b, the outer wheel 200 according to the first and second exemplary embodiments of the present invention includes a cylindrical drum 210 with either a plurality of through holes 211 or irregularities or both and bolt holes 212 formed on either edge of the drum 210 and spaced at regular intervals around the circumference, and a flexible tread part 220 molded into the outer surface of the drum 210 in such a way that the inner periphery of the tread part 220 is embedded in the through holes 211 or irregularities.

The reason why the tread part 220 is molded into the outer surface of the drum 210 in such a way that the inner periphery of the tread part 220 is embedded in the through holes 211 or irregularities is because, conventionally, the tread part 220 and the drum 210 are bonded with an adhesive, so that there may be a distortion between the drum 210 and the tread part 220 due to friction between the road and the tread part 220 when a forklift rotates the tire to turn, thus occasionally causing the tread part 220 to peel off from the drum 210.

In order to avoid the conventional problem of peeling off of the tread part 220, a cylindrical drum 210 may be formed with either a plurality of through holes 211 or irregularities or both, and the tread part 220 may be molded in such a way that the inner periphery of the tread part 220 is embedded in the through holes 211 or irregularities. This way, the present invention may prevent the tread part 220 from peeling off.

Figure 7A:
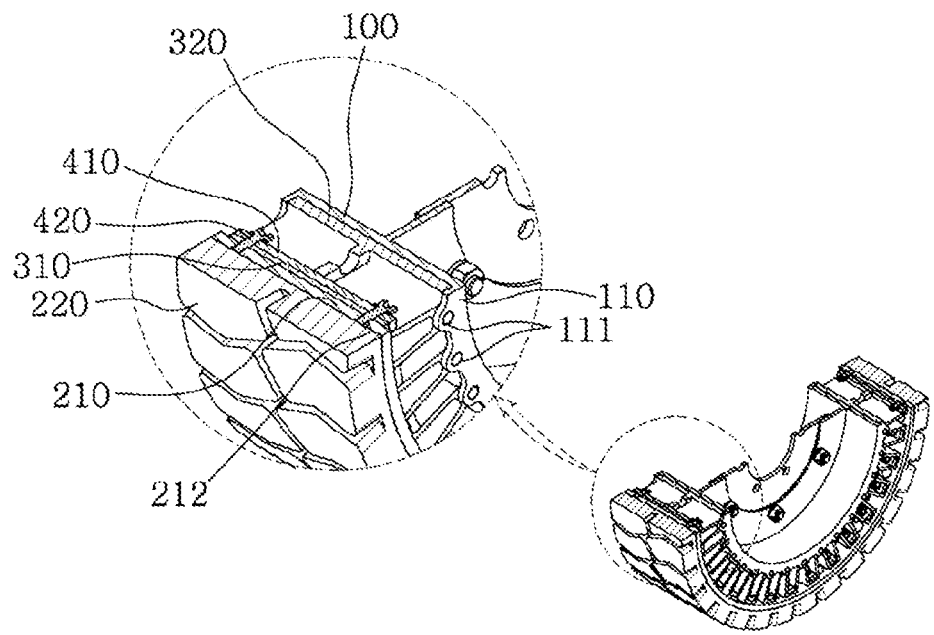
FIGS. 7a and 7b are enlarged sectional views of essential parts which show how a middle wheel and an outer wheel are assembled together, in airless tires according to first and second exemplary embodiments of the present invention.

In a method fastening the middle wheel 300 to the outer wheel 200 having the above-described operational effects according to the first exemplary embodiments, as shown in FIG. 7a, the outer periphery of the middle wheel 300 may be attached to the inner periphery of the outer wheel 200, that is, the inner periphery of the drum 210, and then fixing pieces 410, which are components of a fixing means 400, that are inserted along the width of the elastomers 310 may be fitted to one end of the hollows 311 of the elastomers 310 that faces the outer wheel 200. By fastening the two ends of the fitted fixing pieces 410, the elastomers 310, and the bolt holes 212 of the drum 210 together by inserting bolts 420 through them, the outer wheel 200 and the middle wheel 300 may be detachably held together.

The outer wheel 200 and middle wheel 300 held together as above according to the first exemplary embodiment may be separated from each other by loosening the bolts 420 and detaching the outer wheel 200 from the middle wheel 300.

Figure 7B:
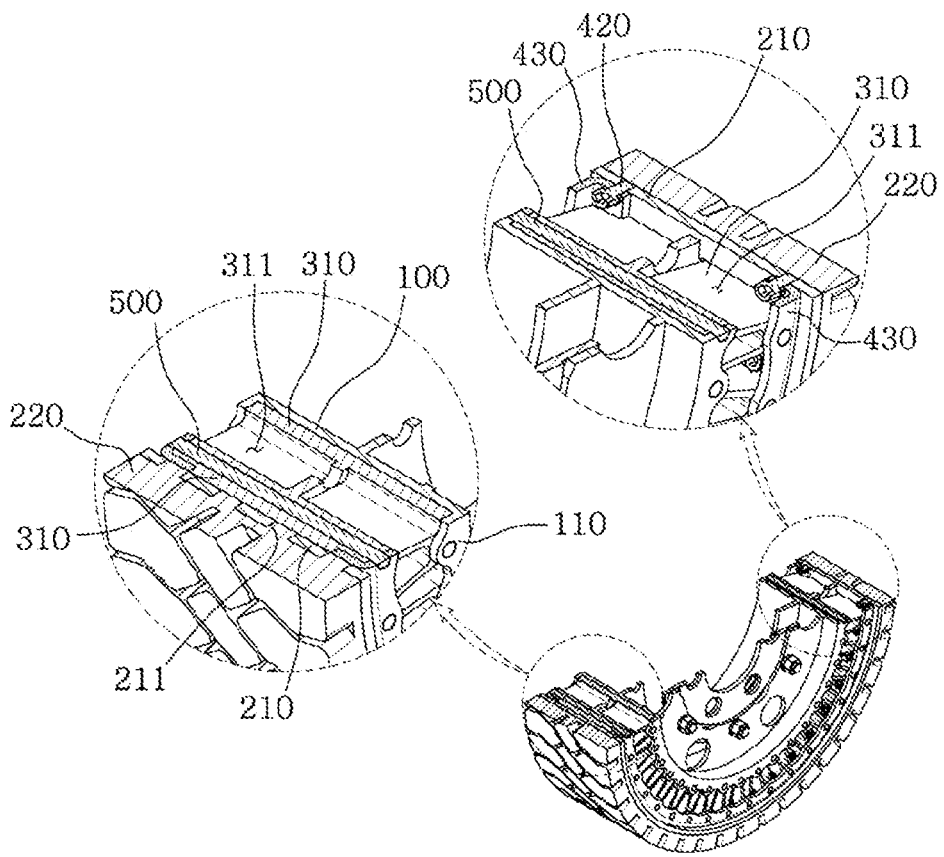

Moreover, in a method of fastening the outer wheel 200 and the middle wheel 300 according to the second exemplary embodiment of the present invention, as shown in FIG. 7b, the outer periphery of the middle wheel 300 may be attached to the inner periphery of the outer wheel 200, that is, the inner periphery of the drum 210, and then L-shaped reinforced rings 430 may be attached to either inside edge of the drum 210. Next, one side of the attached L-shaped reinforced rings 430 and the drum 210 are fixed together by inserting the bolts 420 through contact portions between them, and, at the same time, the outer wheel 200 and the middle wheel 300 are detachably fixed together by inserting fixing pins 440 along the other side of the L-shaped reinforced rings 430 and the width of the elastomers 310.

The outer wheel 200 and middle wheel 300 held together as above according to the second exemplary embodiment may be separated from each other by removing the bolts 420 and the fixing fins 440 and detaching the outer wheel 200 and the middle wheel 300 from each other.

Meanwhile, stepped parts 340, shorter in height than the middle part, are formed around the circumference on either edge of the elastomers 310 arranged at regular intervals, and the depth of the stepped parts 340 correspond to the thickness of one side of the L-shaped reinforced rings 430 mounted on the drum 210. The stepped parts 340 are formed in order that one side of the L-shaped reinforced rings 320 mounted on the drum 210 are seated in place.

The L-shaped reinforced rings 430 are mounted on the drum 210 to improve the durability of the drum 210.

Figure 8:
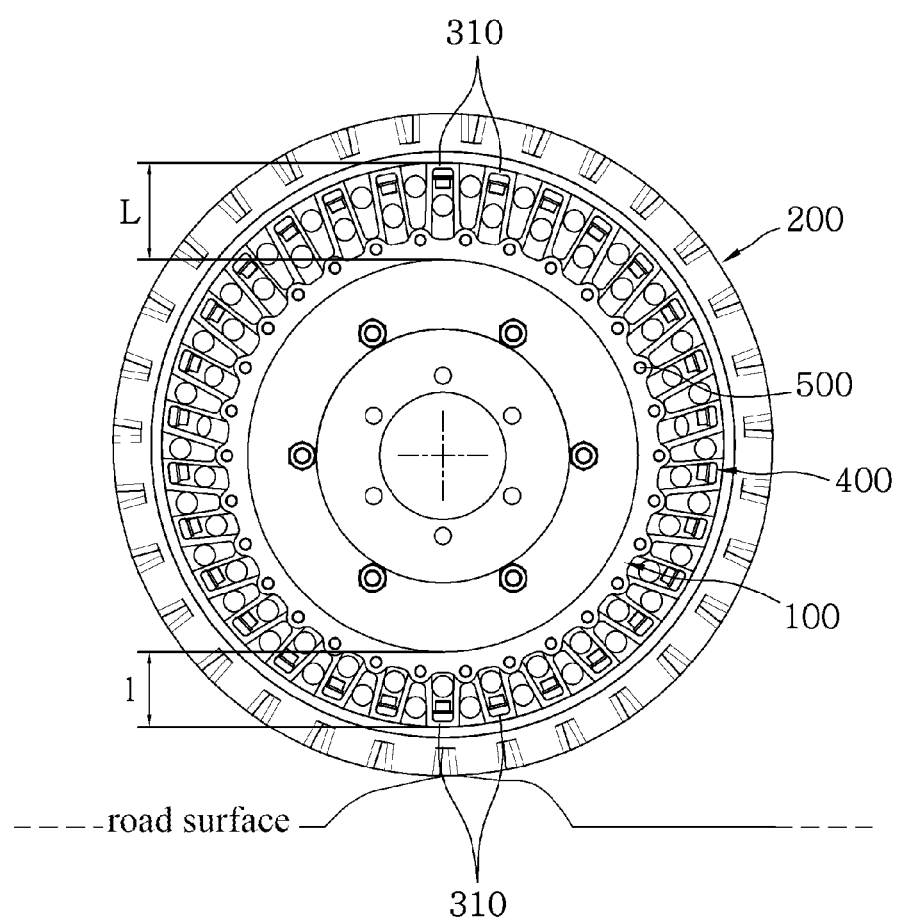
FIG. 8 is a schematic view for explaining how an airless tire according to the present invention works.

The above-described tire according to the present invention is then attached to the axle of a forklift. As shown in FIG. 8, once the tire climbs over an irregular road surface—that is, a bump in a road, this puts pressure to the lower portion of the tire and at the same time the elastomers 310 located in the lower portion of the middle wheel 300 are compressed and their length I becomes shorter and the length L of the elastomers 310 located in the upper portion of the middle wheel 300 becomes longer. As such, the outer wheel 200 becomes displaced with respect to the inner wheel 100, and the middle wheel 300 cushions and absorbs shocks, so that the forklift is able to travel as the tire of the present invention rotates stably.

Moreover, once the tire according to the present invention passes over a bump in a road, the extended elastomers 310 and the compressed elastomers 310 return to their original shape, allowing the tire to work properly and run stably.

The above-explained airless tire according to the present invention prevents a tread part from peeling off the outer wheel as it comes into contact with the road surface during rotation or driving, gives a more comfortable ride by minimizing shocks and rattles caused by an irregular road surface during driving, allows for replacement of broken or damaged components of the tire, and enhances safety and stiffness.

What is claimed is:

1. A wheel and airless tire assembly comprising:
  a cylindrical inner wheel including flanges on either edge that face each other, the flanges having fin fastening holes spaced at regular intervals around the circumference;
  a cylindrical outer wheel for receiving the inner wheel, the cylindrical outer wheel comprising a drum and a tread part molded into an axially outer surface of the drum with either a plurality of through holes or irregularities or both in such a way as to be united with the drum, with an axially inner periphery of the tread part being embedded in the through holes or irregularities;
  a cylindrical middle wheel mounted between the inner wheel and the outer wheel, that includes quadrangular elastomers with hollows inside that are arranged at regular intervals, a peripheral part with fin fastening holes that is formed on an axially inner periphery of the arranged elastomers, and ribs formed in a middle of the elastomers;
  a fixing means for firmly attaching an axially inside of the outer wheel to an axially outside of the middle wheel and then detachably uniting the middle wheel and the outer wheel; and
  coupling fins that allow the inner wheel and the middle wheel to be detachably held together by being inserted through the fin fastening holes of the inner wheel and the fin fastening holes of the middle wheel, after the axially inside of the middle wheel is firmly attached to an axially outside of the inner wheel.

2. The wheel and airless tire assembly of claim 1, wherein the flanges of the inner wheel come into close contact with the peripheral part of the middle wheel while holding the same.

3. The wheel and airless tire assembly of claim 1, wherein the elastomers are in either a rectangular or trapezoidal shape.

4. The wheel and airless tire assembly of claim 1, wherein stepped parts, shorter in height than a middle part, are formed around the circumference on either edge of the elastomers arranged at regular intervals.

5. The wheel and airless tire assembly of claim 1, wherein the fixing means comprises:
  fixing pieces attached to the hollows of the elastomers by being inserted along a width of the elastomers; and bolts for fixing two ends of the fixing pieces, the elastomers, and the drum together by being inserted therethrough.

6. The wheel and airless tire assembly of claim 1, wherein the fixing means comprises:
   L-shaped reinforced rings attached to either axially inside edge of the drum;
   bolts for fixing one side of the reinforced rings and the drum together by being inserted therethrough; and
   fixing pins that are inserted along an other side of the reinforced rings and a width of the elastomers.

7. The wheel and airless tire assembly of claim 1, wherein a hub that configures to fit in with a wheel axle mounting structure is mounted inside the inner wheel.

* * * * *